United States Patent
Gumpoltsberger (10) Patent No.: US 8,113,983 B2
(45) Date of Patent: Feb. 14, 2012

(54) MULTI-STEP TRANSMISSION

(75) Inventor: Gerhard Gumpoltsberger, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 332 days.

(21) Appl. No.: 12/598,252

(22) PCT Filed: Apr. 24, 2008

(86) PCT No.: PCT/EP2008/054966
§ 371 (c)(1),
(2), (4) Date: Oct. 30, 2009

(87) PCT Pub. No.: WO2008/138723
PCT Pub. Date: Nov. 20, 2008

(65) Prior Publication Data
US 2010/0130323 A1 May 27, 2010

(30) Foreign Application Priority Data
May 15, 2007 (DE) .......................... 10 2007 022 776

(51) Int. Cl.
*F16H 3/62* (2006.01)
(52) U.S. Cl. ...................................... 475/275
(58) Field of Classification Search .......... 475/275–278, 475/284, 296
See application file for complete search history.

(56) References Cited

U.S. PATENT DOCUMENTS

| | | | |
|---|---|---|---|
| 4,038,888 A * | 8/1977 | Murakami et al. | 475/276 |
| 4,395,925 A | 8/1983 | Gaus | |
| 5,106,352 A | 4/1992 | Lepelletier | |
| 6,139,463 A | 10/2000 | Kasuya et al. | |
| 6,176,803 B1 * | 1/2001 | Meyer et al. | 475/286 |
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,648,789 B1 | 11/2003 | Usoro et al. | |
| 6,860,831 B2 | 3/2005 | Ziemer | |
| 6,962,549 B2 | 11/2005 | Dreibholz et al. | |
| 7,018,319 B2 * | 3/2006 | Ziemer | 475/296 |
| 7,186,202 B2 | 3/2007 | Gumpoltsberger | |
| 7,273,438 B2 | 9/2007 | Tiesler et al. | |
| 2003/0054917 A1 | 3/2003 | Raghavan et al. | |
| 2003/0195079 A1 | 10/2003 | Raghavan et al. | |
| 2004/0097324 A1 | 5/2004 | Ziemer | |

FOREIGN PATENT DOCUMENTS
DE 29 36 969 A1 4/1981
(Continued)

Primary Examiner — Ha D. Ho
(74) Attorney, Agent, or Firm — Davis & Bujold, P.L.L.C.

(57) ABSTRACT

A multi-step transmission with forward and reverse gears comprises planetary gearsets, shafts and shift elements. The input shaft is coupled to the sun gear of gearset (P2) and, via a clutch (15), to a shaft (5) which is coupled to the carrier of gearset (P3) and, via brake (05), to the transmission housing and, via clutch (57), to shaft (7). Shaft (7) is coupled to the carrier of gearset (P2) and the ring gear of gearset (P1). Shaft (6) is coupled to the sun gear of gearset (P3) and the ring gear of gearset (P2) and, via clutch (36), to shaft (3) which is coupled the carrier of gearset (P1) and, via brake (03), to the housing. Shaft (4) is connected to the sun gear of gearset (P1) and can be coupled, via brake (04), to the housing. The output shaft (2) is connected to the ring gear of gearset (P3).

22 Claims, 4 Drawing Sheets

FOREIGN PATENT DOCUMENTS

| | | |
|---|---|---|
| DE | 199 12 480 A1 | 9/2000 |
| DE | 199 49 507 A1 | 4/2001 |
| DE | 101 15 983 A1 | 10/2002 |
| DE | 101 15 987 A1 | 10/2002 |
| DE | 102 13 820 A1 | 10/2002 |
| DE | 102 44 023 A1 | 4/2004 |
| DE | 10 2004 023 951 A1 | 12/2005 |
| DE | 10 2004 040 599 A1 | 3/2006 |
| EP | 0 434 525 A1 | 6/1991 |
| WO | 2004/007996 A1 | 1/2004 |

\* cited by examiner

Fig. 1

| | 03 | 04 | 05 | 15 | 36 | 57 | i | phi |
|---|---|---|---|---|---|---|---|---|
| 1 | | | • | | • | • | 3.654 | 1.859 |
| 2 | • | | | | • | • | 1.965 | 1.445 |
| 3 | | • | | | • | • | 1.359 | 1.359 |
| 4 | | | | • | • | • | 1.000 | 1.308 |
| 5 | | • | | • | • | | 0.765 | 1.202 |
| 6 | • | | | • | • | | 0.636 | 1.174 |
| 7 | • | • | | • | | | 0.542 | |
| R | | • | • | | • | | -3.792 | 6.741 |

MULTI-STEP TRANSMISSION

This application is a National Stage completion of PCT/EP2008/054966 filed Apr. 24, 2008, which claims priority from German patent application serial no. 10 2007 022 776.2 filed May 15, 2007.

FIELD OF THE INVENTION

The present invention concerns a multi-step transmission of planetary structure, in particular an automatic transmission for a motor vehicle.

BACKGROUND OF THE INVENTION

In the prior art, automatic transmissions, especially ones for motor vehicles, comprise planetary gearsets which are shifted by means of frictional or shift elements such as clutches and brakes, and which are usually connected to a starting element that can be operated in slipping mode and can optionally be provided with a bridging clutch such as a hydrodynamic torque converter or a fluid clutch.

A transmission of this kind is described in EP 0 434 525 A1. It comprises essentially a drive input shaft and a drive output shaft arranged parallel to one another, a double planetary gearset arranged concentrically with the drive output shaft, and five shift elements in the form of three clutches and two brakes, whose selective engagement, in each case in pairs, determines the various gear ratios between the input shaft and the output shaft. The transmission also comprises an upstream gearset and two power paths, so that the selective engagement of the five shift elements, two at a time, produces six forward gears.

In this case, to transmit the torque from the upstream gearset to two elements of the double planetary gearset, two clutches are needed. In the force flow direction these are arranged essentially behind the upstream gearset, in the direction of the double planetary gearset. In the second power path a further clutch is provided, which releasably connects to another element of the double planetary gearset. The clutches are arranged so that the inner disk carrier forms the drive output.

Furthermore, from the document U.S. Pat. No. 6,139,463 a compact multi-step transmission of planetary structure, in particular for a motor vehicle is known, which comprises two planetary gearsets and an upstream gearset as well as three clutches and two brakes. In this known multi-step transmission, in a first power path the clutches C-1 and C-3 are provided for transmitting torque from the upstream gearset to the two planetary gearsets. In this case the outer disk carrier, the cylinder or piston and pressure compensation side of the clutch C-3 is connected to a first brake B-1. In addition, the inner disk carrier of the third clutch C-3 is connected to the cylinder, piston or pressure compensation side of the first clutch C-1, and the inner disk carrier of the first clutch C-1 is arranged on the drive output side and is connected to a sun gear of the third planetary gearset.

Furthermore, from DE 199 49 507 A1 by the present applicant a multi-step transmission is known, in which two non-shiftable upstream gearsets are provided on the drive input shaft, which produce two speeds on the output side which, besides the speed of the drive input shaft, can optionally be shifted through to a shiftable double planetary gearset that acts upon the drive output shaft, by selectively engaging the shift elements used in such manner that to shift from one gear into the respective next-higher or next-lower gear, of the two shift elements just actuated only one shift element has to be engaged or disengaged.

From DE 199 12 480 A1 an automatically shifted motor vehicle transmission is known, which has three single-carrier planetary gearsets as well as three brakes and two clutches for shifting between six forward gears and one reversing gear, and with a drive input and a drive output shaft. This automatically shifted motor vehicle transmission is designed in such manner that the drive input shaft is connected directly to the sun gear of the second planetary gearset, while the input shaft can be connected by means of the first clutch to the sun gear of the first planetary gearset and/or by the second clutch to the carrier of the first planetary gearset. In addition or alternatively, the sun gear of the first planetary gearset can be connected by the first brake to the housing of the transmission, and/or the carrier of the first planetary gearset can be connected by the second brake to the housing, and/or the sun gear of the third planetary gearset can be connected by the third brake to the housing.

Furthermore, from DE 102 13 820 A1 a multi-gear automatic transmission is known, which has an first input path T1 of a first transmission ratio; an input path T2 which has a larger transmission ratio than the input path T1; a planetary gearset with four elements, these four element being a first element, a second element, a third element and a fourth element in the sequence of elements in a speed diagram; a clutch C-2 which transmits rotation from the input path T2 to the first element S3; a clutch C-1 which transmits rotation from the input path T1 to the fourth element S2; a clutch C-4 which transmits rotation from the input path T1 to the first element; a clutch C-3 which transmits rotation from the input path T1 to the second element C3; a brake B-1 which engages the fourth element; a brake B-2 which engages the second element; and a drive output element, which is coupled to the third element R3.

In the context of DE 101 15 983 A1 by the present applicant a multi-step transmission is described, which has a drive input shaft connected to an upstream gearset, a drive output shaft connected to a downstream gearset, and a maximum of seven shift elements, by the selective shifting of which at least seven forward gears can be engaged without a range shift. The upstream gearset is formed by an upstream planetary gearset or a maximum of two non-shiftable upstream planetary gearsets coupled to the first upstream planetary gearset, while the downstream gearset is formed as a two-carrier, four-shaft transmission with two shiftable downstream planetary gearsets and four free shafts. The first free shaft of this two-carrier, four-shaft transmission is connected to the first shift element, the second free shaft to the second and third shift elements, the third free shaft to the fourth and fifth shift elements, and the fourth free shaft is connected to the drive output shaft. For a multi-step transmission with a total of six shift elements it is proposed according to the invention to connect the third free shaft or the first free shaft of the downstream gearset additionally to a sixth shift element (D') and to connect the first free shaft additionally to a seventh shift element.

Furthermore, in the context of DE 101 15 987 by the present applicant a multi-step transmission with at least seven gears is described. Besides the drive input shaft and the drive output shaft this transmission consists of a non-shiftable upstream gearset and a shiftable downstream gearset in the form of a two-carrier, four-shaft transmission. The upstream gearset consists of a first planetary gearset which, besides the input speed of the drive input shaft, provides a second speed that can optionally be switched through to the downstream gearset. The downstream gearset consists of two shiftable planetary gearsets which, with the six shift elements, can engage at least seven gears, forming two power paths. In this case, during any shift operation, group shifts are advantageously always avoided. In addition, a 9-gear multi-step transmission is known from DE 29 36 969; this comprises eight shift elements and four gearsets.

DE 102 44 023 A1 by the present applicant describes a change-under-load transmission with positive-interlock and frictional shift elements, in which the positive-interlock shift elements have to be disengaged during upshifts in order to avoid any adverse effect on shift quality.

Automatically shifted vehicle transmissions of planetary structure in general have already often been described in the prior art and constantly undergo further development and improvement. Such transmissions are required to provide a sufficient number of forward gears and a reversing gear, and transmission ratios very well suited for motor vehicles, with a large overall spread and appropriate gear intervals. Furthermore, they should enable a high starting transmission ratio in the forward direction and should comprise a direct gear for use in both passenger vehicles and utility vehicles. In addition, these transmissions should not be characterized by high structural cost and complexity, in particular having a small number of shift elements and avoiding double shifts during sequential shifting processes, so that for shifts in defined gear groups in each case only one shift element is changed.

SUMMARY OF THE INVENTION

The purpose of the present invention is to propose a multi-step transmission of the type mentioned above, in which the structural complexity is optimized, the structural space required is reduced, and in addition the efficiency in high gears is improved in relation to drag and gearing losses. Moreover, in the multi-step transmission according to the invention low torques should act upon the shift elements and planetary gearsets, and the rotational speeds of shafts, shift elements and planetary gearsets should be kept as low as possible. Finally, the transmission according to the invention should be suitable for any mounting configuration in a vehicle, in particular for a front-transverse arrangement.

Accordingly, a multi-step transmission is proposed according to the invention, which comprises a drive input and a drive output shaft arranged in a housing. In addition at least three planetary gearsets are provided, referred to in what follows as the first, second and third planetary gearsets, as well as at least seven rotary shafts—referred to in what follows as the drive input shaft, the drive output shaft and the third, fourth, fifth, sixth and seventh shafts—and six shift elements, including brakes and clutches, whose selective engagement produces various transmission ratios between the drive input and the drive output shaft, so that preferably six forward gears and a reversing gear can be obtained. According to the invention the planetary gearsets are preferably designed as negative planetary gearsets.

According to the invention the drive input shaft is permanently connected to the sun gear of the second planetary gearset and can be releasably connected by means of a clutch to the fifth shaft, which is permanently connected to the carrier of the third planetary gearset, can be coupled to a housing of the transmission by a brake, and can be releasably connected by a further clutch to the seventh shaft. In turn, the seventh shaft is permanently connected to the carrier of the second planetary gearset and to the ring gear of the first planetary gearset, and the sixth shaft is permanently connected to the sun gear of the third planetary gearset and to the ring gear of the second planetary gearset and can be releas-ably connected by another clutch to the third shaft, which is permanently connected to the carrier of the first planetary gearset and which can be coupled by a further brake to a housing of the transmission. The fourth shaft is permanently connected to the sun gear of the first planetary gearset and can be coupled by another brake to a housing of the transmission. According to the invention, it is provided that the drive output shaft is permanently connected to the ring gear of the third planetary gearset.

According to a particularly advantageous design feature of the invention, the clutch that releasably connects the third shaft to the sixth shaft is made as a positive-interlock shift element. In addition, the clutch that releasably connects the fifth shaft to the seventh shaft and the brake by means of which the fifth shaft can be coupled to the housing, can also be made as positive-interlock shift elements. This is made possible because according to the invention, during upshifts, the shift elements are only disengaged but never engaged.

Owing to the design of the multi-step transmission according to the invention, transmission ratios particularly suitable for passenger vehicles are obtained, along with a considerable increase in the overall spread of the multi-step transmission, whereby the driving comfort is improved and the fuel consumption is significantly reduced.

Furthermore, with the multi-step transmission according to the invention the structural complexity is considerably reduced since the number of shift elements is small, preferably just three brakes and three clutches. Advantageously, with the multi-step transmission according to the invention it is possible to start off with the help of a hydrodynamic converter, an external starting clutch, or even with other suitable external starting elements. It is also conceivable to start off by means of a starting element integrated in the transmission. A shift element which is actuated in the first forward gear and in the reverse gear is to be preferred.

Moreover, with the multi-step transmission according to the invention the efficiency in high gears is good in relation to drag and gearing losses.

Furthermore, the torques acting on the shift elements and planetary gearsets of the multi-step transmission are low, which reduces wear in the multi-step transmission in an advantageous manner. Besides, since the torques are low the size of components can be correspondingly smaller, and this reduces the structural space occupied and the corresponding costs. In addition, the rotational speeds of shafts, shift elements and planetary gearsets are low.

Moreover, the transmission according to the invention is so designed that it can be adapted to various drivetrain configurations, both in the force flow direction and from the standpoint of the structural space it occupies; for example, it is possible for the drive input and output to be located on the same side of the housing.

BRIEF DESCRIPTION OF THE DRAWINGS

Below, the invention is explained in more detail with reference to examples and to the drawings, which show.

DETAILED DESCRIPTION OF THE PREFERRED EMBODIMENTS

Figure 1:
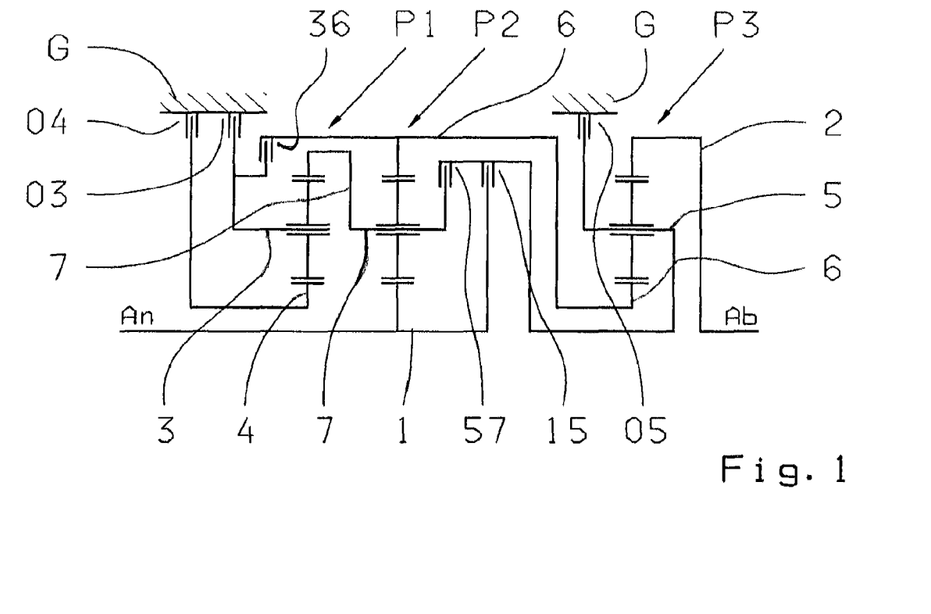
FIG. 1: Schematic representation of a preferred embodiment of a multi-step transmission according to the invention, in which seven forward gears can be engaged.

FIG. 1 shows a multi-step transmission according to the invention, with a drive input shaft 1 (An) and a drive output shaft 2 (Ab), which are arranged in a housing G of the transmission. Three planetary gearsets P1, P2, P3 are provided, which are preferably designed as negative planetary gearsets. In the embodiment shown in FIG. 1 the planetary gearsets are arranged one after another in the axial direction, in the sequence of P1, P2 and P3.

As can be seen in FIG. 1, six shift elements are provided, namely three brakes 03, 04, 05 and three clutches 15, 36 and 57.

With these shift elements, seven forward gears and one reversing gear can be engaged by selective shifting. The multi-step transmission according to the invention has a total of seven rotary shafts, namely shafts 1, 2, 3, 4, 5, 6 and 7.

According to the invention, in the multi-step transmission of FIG. 1 it is provided that the drive input takes place via shaft 1, which is permanently connected to the sun gear of the second planetary gearset P2 and can be releasably connected by a clutch 15 to shaft 5, this in turn being permanently connected to the carrier of the third planetary gearset P3, can be coupled by the brake 05 to the housing G, and can be releasably connected by the clutch 57 to a shaft 7. The shaft 7 is permanently connected to the carrier of the second planetary gearset P2 and to the annular gear of the first planetary gearset P1, and a shaft 6 is permanently connected to the sun gear of the third planetary gearset P3 and to the ring gear of the second planetary gearset P2, and can also be releasably connected by a clutch 36 to the shaft 3, which latter is permanently connected to the carrier of the first planetary gearset P1 and can be coupled by a brake 03 to a housing G of the transmission. There is also a shaft 4, which is permanently connected to the sun gear of the first planetary gearset P1 and can be coupled by a brake 04 to a housing G of the transmission. The drive output takes place via the shaft 2, which is permanently connected to the ring gear of the third planetary gearset P3.

In the embodiment shown in FIG. 1 the clutches 15, 15, viewed axially, are arranged between the second and the first planetary gearsets. The shift elements can be spatially arranged in any desired configuration, this being restricted only by their size and external shape.

Figure 2:
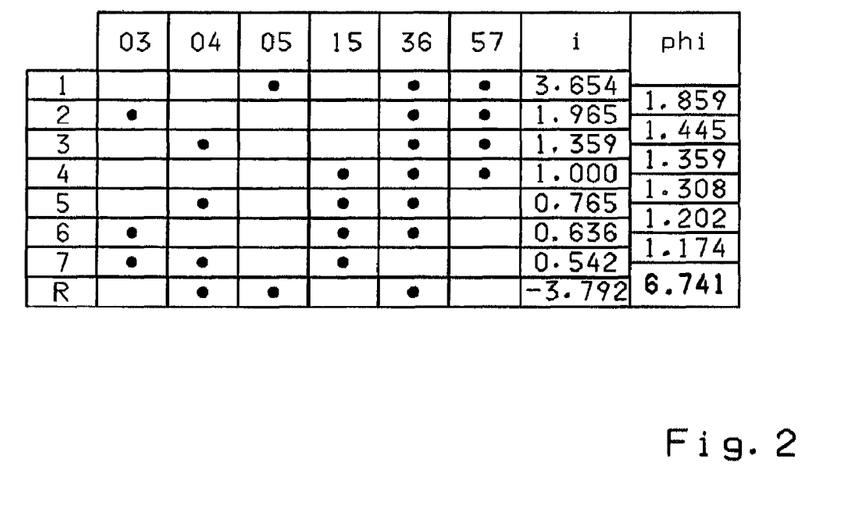
FIG. 2: Example of a shifting scheme for the multi-step transmission according to the invention shown in FIG. 1.

FIG. 2 shows an example shift scheme for the multi-step transmission according to FIG. 1. For each gear three shift elements are engaged. The shift scheme shows, as examples, the respective transmission ratios i of the individual gear steps and the step intervals phi determined from these. From FIG. 2 it can be seen that during sequential shifts, double shifts or group shifts are avoided since any two adjacent gear-steps use two shift elements in common. Moreover, the fourth gear is advantageously designed as a direct gear.

The first gear is obtained by engaging the clutches 36, 57 and the brake 05, the second gear by engaging the clutches 36, 57 and the brake 03, the third gear by engaging the clutches 36, 57 and the brake 04, and the fourth gear by engaging the clutches 36, 57 and 15. Then, the fifth gear is obtained by engaging the clutches 15, 36 and the brake 04, the sixth gear by engaging the clutches 15, 36 and the brake 03, and the seventh gear by engaging the clutch 15 and the brakes 03, 04.

As can be seen from the shift scheme, the reversing gear is obtained by engaging the brakes 04, 05 and the clutch 36.

In this case it can be seen that the shift elements 05, 36 and 57 are only ever disengaging during upshifts, and never engaged. This means that in conventional change-under-load shifts the shift elements have to be disengaged at the load-transfer point. For that reason these shift elements can be made as positive-interlock shift elements, for example claw clutches or synchronizers, The brakes 03, 04 and the clutch 15 are preferably made as frictional shift elements.

Figure 3:
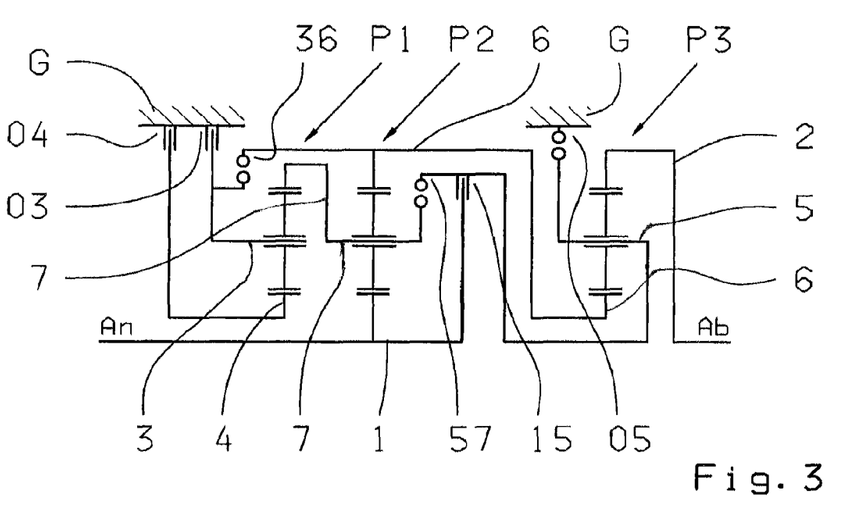
FIG. 3: Schematic representation of a preferred embodiment of a multi-step transmission according to the invention, in which three positive-interlock shift elements are used.

A transmission designed in this way is the object of FIG. 3, in which the positive-interlock shift elements are indicated by circles. The couplings and the arrangement of the components correspond to the couplings and arrangement of the transmission shown in FIG. 1. Moreover, the shift scheme for this transmission corresponds to that shown in FIG. 2.

Thanks to the design of the shift elements 05, 36 and 57 as positive-interlock claw clutches or synchronizers, the efficiency of the transmission is optimized since no drag losses occur in positive-interlock shift elements when they are disengaged. For example, in the seventh gear all the frictional shift elements are engaged, so that in the seventh gear only the gear-teeth and perhaps consumers such as a hydraulic pump create losses.

Furthermore, a more compact structure can be obtained since in their engaged condition the positive-interlock shift elements have to transmit a lot of torque when engaged, especially in the first gear and in the reversing gear; but because they operate with positive interlock these shift elements can be made substantially more compact. Another advantage is that owing to the design of two clutches with positive interlock, the hydraulic rotary transmitters for the delivery of pressure oil to the clutches can be made less complex and costly.

Accordingly a seven-gear transmission is obtained, which has a suitable step sequence and—compared with the known prior art—substantially reduced losses, a more compact structure and lower costs.

Such a transmission is particularly suitable for front-transverse drivetrains or also for use in utility vehicles, since the advantageous properties mentioned are needed in such vehicles.

According to the invention, starting off is possible with an integrated shift element (ISE). In such a case it is particularly suitable to use a shift element which is needed in the first and the reversing gears with no change of the rotation direction (the clutch 36).

According to the invention, even with the same transmission layout, different gear intervals can be obtained depending on the shift logic, thus enabling application-specific or vehicle-specific variation.

Figure 4:
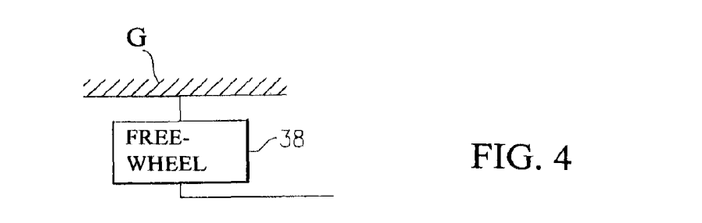
FIG. 4: Schematic representation of an embodiment of the inventive multi-speed transmission having a freewheel.

It is also possible to provide, as seen in FIG. 4, additional freewheels 38 at any suitable points of the multi-step transmission, for example between a shaft and the housing G, or to connect two shafts if necessary.

Figure 5:
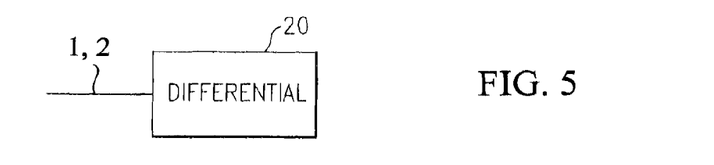
FIG. 5: Schematic representation of the inventive multi-step transmission having a differential.

According to the invention, as seen in FIG. 5, an axle differential and/or a distributor differential 20 can be arranged on the drive input side or on the drive output side.

Figure 6:
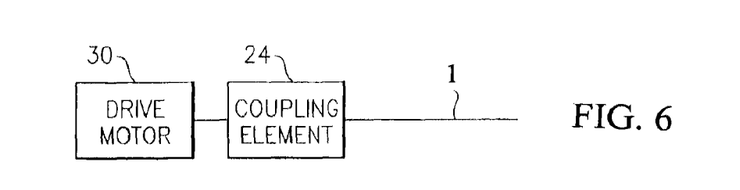
FIG. 6: Schematic representation of the inventive multi-step transmission with a coupling element and a drive motor.

In an advantageous further development, as seen in FIG. 6, the drive input shaft 1 can be disconnected from a drive motor 30 when necessary by a coupling element 24, and as the clutch element a hydrodynamic converter, a hydraulic clutch, a dry starting clutch, a wet starting clutch, a magnetic powder clutch or a centrifugal force clutch can be used.

Figure 7:
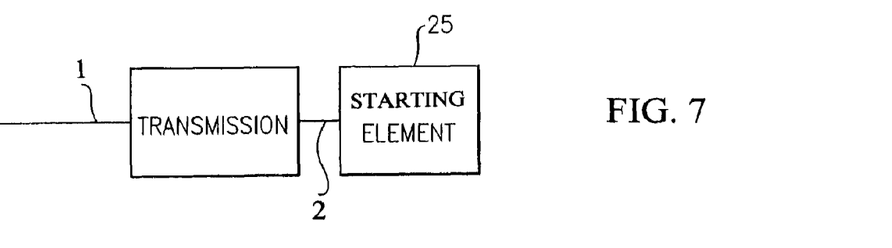
FIG. 7: Schematic representation of the inventive multi-step transmission with a starting element located behind the multi-step transmission.
Figure 8:
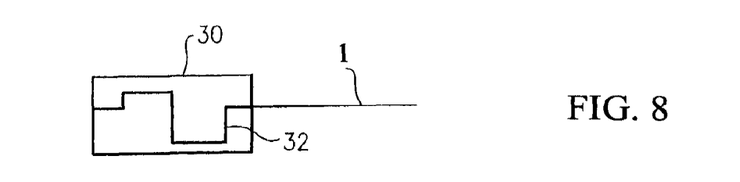
FIG. 8: Schematic representation of the inventive multi-step transmission with the crankshaft of the drive motor fixed to the input shaft of the multi-step transmission.

Such a starting element 25, as seen in FIG. 7, can also be arranged behind the transmission in the force flow direction, and in such a case the drive input shaft 1 is permanently connected to the crankshaft 32 of the motor 30, as seen in FIG. 8.

Figure 9:
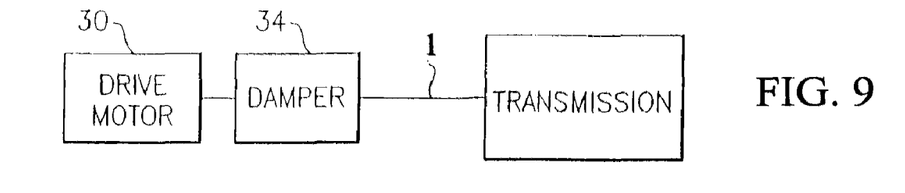
FIG. 9: Schematic representation of the inventive multi-step transmission having the drive motor communicating with a damper.

The multi-step transmission according to the invention, as seen in FIG. 9, also allows a torsion fluctuation damper 35 to be arranged between the motor 30 and the transmission.

Figure 10:
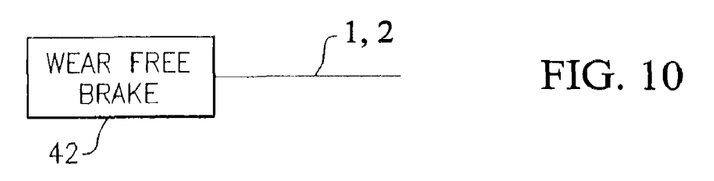
FIG. 10: Schematic representation of the inventive multi-step transmission having a wear free brake.
Figure 11:
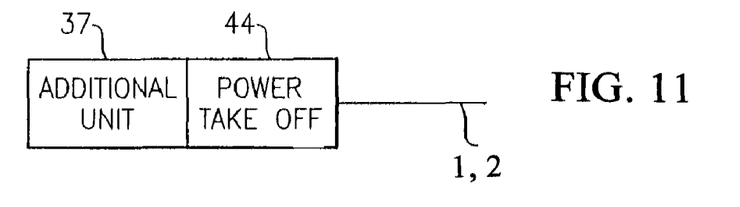
FIG. 11: Schematic representation of the inventive multi-step transmission with a power take-off for driving an additional unit.

In another embodiment of the invention, as seen in FIG. 10, a wear-free brake 42 such as a hydraulic or electric retarder or suchlike can be arranged on any shaft, preferably on the drive input shaft 1 or on the drive output shaft 2, this being particularly important for use in utility vehicles. Furthermore, an auxiliary power take off 44 can be provided on any shaft in order to drive additional units 37, preferably on the drive input shaft 1 or on the drive output shaft 2, as seen in FIG. 11.

The shift elements used can be in the form of change-under-load clutches or brakes. In particular, friction clutches or brakes such as disk clutches, belt brakes and/or conical clutches can be used. Furthermore, positive-interlock brakes and/or clutches such as synchronizers or claw clutches can be used as shift elements.

Figure 12:
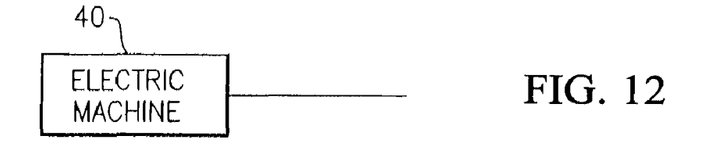
FIG. 12: Schematic representation of the inventive multi-step transmission with an electric machine.
Figure 13:
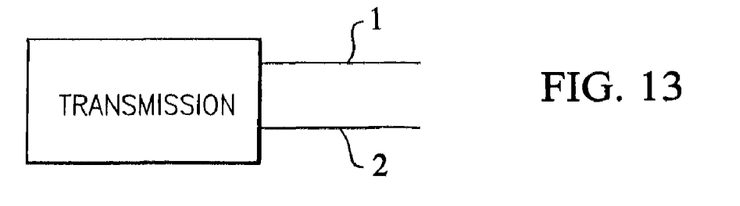
FIG. 13: Schematic representation of the inventive multi-step transmission with the input and the output being provided on the same side of the multi-step transmission housing.

A further advantage of the multi-step transmission described here is that an electric machine 40 can be attached to any shaft as a generator and/or as an additional drive machine, as viewed in FIG. 12. The drive input shaft 1 and the drive output shaft 2 are provided on the same side of the transmission housing G, as seen in FIG. 13.

Of course, any design forms and in particular any spatial configurations of the planetary gearsets and shift elements, in themselves and relative to one another, provided that they are technically appropriate, are covered by the scope of protection of the present claims, without influencing the function of the transmission as indicated in the claims, even if these forms are not explicitly represented in the figures or in the description.

INDEXES
1 Shaft
2 Shaft
3 Shaft
4 Shaft
5 Shaft
6 Shaft
7 Shaft
03 Brake
04 Brake
05 Brake
15 Clutch
36 Clutch
57 Clutch
P1 Planetary gearset
P2 Planetary gearset
P3 Planetary gearset
i Transmission ratio
phi Step interval
G Housing

The invention claimed is:

1. A multi-step automatic transmission of planetary structure for a motor vehicle, the transmission comprising:
 a drive input shaft (1) and a drive output shaft (2) being arranged in a transmission housing (G);
 first, second and third planetary gearsets (P1, P2, P3), each of the first, the second and the third planetary gearsets (P1, P2, P3) comprising a sun gear, a carrier and a ring gear;
 at least third, fourth, fifth, sixth, and seven rotary shafts (3, 4, 5, 6, 7);
 six shift elements (03, 04, 05, 15, 36, 57) comprising first, second, and third brakes (03, 04, 05) and first, second, and third clutches (15, 36, 57) whose selective engagement produces various transmission ratios between the drive input shaft (1) and the drive output shaft (2) such that seven forward gears and one reverse gear can be implemented;
 the drive input shaft (1) being integrally coupled to the sun gear of the second planetary gearset (P2) and being connectable, via the first clutch (15), to the fifth shaft (5);
 the drive output shaft (2) being integrally coupled to the ring gear of the third planetary gearset (P3);
 the third shaft (3) being integrally coupled to the carrier of the first planetary gearset (P1) and being connectable, via the first brake (03), to the transmission housing (G);
 the fourth shaft (4) being integrally coupled to the sun gear of the first planetary gearset (P1) and is connectable, via the second brake (04), to the transmission housing (G);
 the fifth shaft (5) being integrally coupled to the carrier of the third planetary gearset (P3), being connectable, via the third brake (05) to the transmission housing (G), and, via the third clutch (57), to the seventh shaft (7);
 the sixth shaft (6) being integrally coupled to the sun gear of the third planetary gearset (P3) and the ring gear of the second planetary gearset (P2) and being connectable, via the second clutch (36), to the third shaft (3); and
 the seventh shaft (7) being integrally coupled to the carrier of the second planetary gearset (P2) and the ring gear of the first planetary gearset (P1).

2. The multi-step automatic transmission according to claim 1, wherein the first and the third clutches (15, 57) are axially located between the second and the third planetary gearsets (P2, P3).

3. The multi-step automatic transmission according to claim 1, wherein the third brake (05) and the second and the third clutches (36, 57) are positive-interlock shift elements and the first and the second brakes (03, 04) and the first clutch (15) are frictional shift elements.

4. The multi-step automatic transmission according to claim 1, wherein the first, the second and the third planetary gearsets (P1, P2, P3) are minus planetary gearsets.

5. The multi-step automatic transmission according to claim 1, wherein a first forward gear is implemented by engaging the second clutch (36), the third clutch (57) and the third brake (05), a second forward gear is implemented by engaging the second clutch (36), the third clutch (57) and the first brake (03), a third forward gear is implemented by engaging the second clutch (36), the third clutch (57) and the second brake (04), a fourth forward gear is implemented by engaging the first clutch (15), the second clutch (36) and the third clutch (57), a fifth forward gear is implemented by engaging the first clutch (15), the second clutch (36) and the second brake (04), a sixth forward gear is implemented by engaging the first clutch (15), the second clutch (36) and the first brake (03) and a seventh forward gear is implemented by engaging the first clutch (15), the first brake (03) and the second brake (04).

6. The multi-step automatic transmission according to claim 1, wherein the reverse gear is implemented by engaging the second brake (04), the third brake (05) and the second clutch (36).

7. The multi-step automatic transmission according to claim 1, wherein at least one freewheel is provided within the transmission housing (G).

8. The multi-step automatic transmission according to claim 7, wherein the at least one freewheel is provided between the transmission housing (G) and at least one of the input shaft (1), the output shaft (2), the third shaft (3), the fourth shaft (4), the fifth shaft (5), the sixth shaft (6), and the seventh shaft (7).

9. The multi-step automatic transmission according to claim 1, wherein the drive input shaft (1) and the drive output shaft (2) are provided on a same side of the transmission housing (G).

10. The multi-step automatic transmission according to claim 1, wherein at least one of an axle differential and a distributor differential is arranged either on the drive input side or the drive output side.

11. The multi-step automatic transmission according to claim 1, wherein the drive input shaft (1) is disconnectable from a drive motor by a coupling element.

12. The multi-step automatic transmission according to claim 11, wherein the coupling element is one of a hydrodynamic converter, a hydraulic clutch, a dry starting clutch, a wet starting clutch, a magnetic powder clutch and a centrifugal clutch.

13. The multi-step automatic transmission according to claim 1, wherein an external starting element is arranged behind the transmission in a force flow direction, and the drive input shaft (1) is integrally connected to a crankshaft of a drive motor.

14. The multi-step automatic transmission according to claim 1, wherein one of the six shift elements (36) of the transmission facilitates starting and the drive input shaft (1) is integrally connected to a crankshaft of a drive motor.

15. The multi-step automatic transmission according to claim 1, wherein a torsion fluctuation damper is arranged between the motor and the transmission.

16. The multi-step automatic transmission according to claim 1, wherein a wear-free brake is arranged on one of the input shaft (1), the output shaft (2), the third shaft (3), the fourth shaft (4), the fifth shaft (5), the sixth shaft (6) and the seventh shaft (7).

17. The multi-step automatic transmission according to claim 1, wherein an power take off, for driving an additional unit, is arranged on one of the input shaft (1), the output shaft (2), the third shaft (3), the fourth shaft (4), the fifth shaft (5), the sixth shaft (6) and the seventh shaft (7).

18. The multi-step automatic transmission according to claim 17, wherein the power take off output is arranged on one of the drive input shaft (1) and the drive output shaft (2).

19. The multi-step automatic transmission according to claim 1, wherein the shift elements are one of change-under-load clutches and change-under-load brakes.

20. The multi-step automatic transmission according to claim 19, wherein the shift elements are one of disk clutches, belt brakes and conical clutches.

21. The multi-step automatic transmission according to claim 1, wherein the shift elements are one of positive-interlock brakes and positive-interlock clutches.

22. The multi-step automatic transmission according to claim 1, wherein an electric machine is connected to one of the input shaft (1), the output shaft (2), the third shaft (3), the fourth shaft (4), the fifth shaft (5), the sixth shaft (6), and the seventh shaft (7) and the electric machine is at least one of a generator and an additional drive machine.

* * * * *